(12) United States Patent
Garcia et al.

(10) Patent No.: US 7,064,502 B2
(45) Date of Patent: Jun. 20, 2006

(54) POWER TOOL WITH REMOTE STOP

(75) Inventors: Jaime E. Garcia, Jackson, TN (US); Jeffrey D. Weston, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/898,157

(22) Filed: Jul. 23, 2004

(65) Prior Publication Data

US 2005/0248303 A1    Nov. 10, 2005

Related U.S. Application Data

(63) Continuation-in-part of application No. 10/720,022, filed on Nov. 21, 2003.

(60) Provisional application No. 60/428,371, filed on Nov. 22, 2002.

(51) Int. Cl.
*F16P 3/00* (2006.01)

(52) U.S. Cl. .................. 318/16; 318/17; 318/551; 388/937; 307/326

(58) Field of Classification Search .................. 318/16, 318/17, 551, 563; 388/937; 307/326, 112, 307/139, 140
See application file for complete search history.

(56) References Cited

U.S. PATENT DOCUMENTS

| 4,351,209 | A |   | 9/1982 | Alford | 83/788 |
|---|---|---|---|---|---|
| 4,591,731 | A | * | 5/1986 | Garcia | 307/132 R |
| 4,839,533 | A | * | 6/1989 | Aga | 307/140 |
| 4,871,036 | A | * | 10/1989 | Parrott | 173/215 |
| 4,912,384 | A | * | 3/1990 | Kinoshita et al. | 318/569 |
| 5,081,406 | A | * | 1/1992 | Hughes et al. | 318/478 |
| 5,201,684 | A | * | 4/1993 | DeBois, III | 452/127 |
| 5,526,915 | A | * | 6/1996 | Bessette et al. | 192/130 |
| 5,672,044 | A | * | 9/1997 | Lemelson | 414/744.3 |
| 6,672,407 | B1 | * | 1/2004 | Streich | 175/58 |
| 6,680,673 | B1 | * | 1/2004 | Wong | 340/825.69 |
| 6,812,596 | B1 | * | 11/2004 | Veil | 307/326 |
| 2002/0190947 | A1 |   | 12/2002 | Feinstein | 345/158 |
| 2004/0108120 | A1 |   | 6/2004 | Wiesner et al. | 173/2 |

FOREIGN PATENT DOCUMENTS

| DE | 19902130 | 1/1999 |
|---|---|---|
| DE | 10029138 | 6/2000 |
| DE | 10216206 | 4/2002 |
| EP | 1077301 | 2/2001 |
| EP | 1391263 | 2/2004 |
| JP | 63245349 | 10/1988 |

* cited by examiner

*Primary Examiner*—Bentsu Ro
(74) *Attorney, Agent, or Firm*—Adan Ayala

(57) ABSTRACT

The present invention is directed to a power tool including a wireless remote stop for terminating the flow of electricity to an electric motor. The electric motor is configured for operating a working element assembly of a power tool, such as an arbor/circular saw blade included a table saw. In an embodiment, a remote stop is a hand-held fob, having a housing and a button. Alternatively, the remote stop may be implemented as a foot pedal apparatus, for being disposed on a shop floor.

21 Claims, 3 Drawing Sheets

POWER TOOL WITH REMOTE STOP

CROSS-REFERENCE TO RELATED APPLICATIONS

The present application is a continuation-in-part of and claims priority under 35 U.S.C. § 120 to U.S. application Ser. No. 10/720,022, filed Nov. 21, 2003, which claims the benefit under 35 U.S.C. § 119(e) of U.S. Provisional Application Ser. No. 60/428,371, filed Nov. 22, 2002. Said U.S. application Ser. No. 10/720,022 and U.S. Provisional Application Ser. No. 60/428,371 are herein incorporated by reference in their entirety.

FIELD OF THE INVENTION

The present invention generally relates to the field of power tools, and more particularly to a power tool having a wireless remote stop.

BACKGROUND OF THE INVENTION

Current power tools typically have a power button located on a main body of the tool. However, the placement of such a button does not allow for remote stopping of a working element of the tool, such as stopping a saw blade of a table saw, or the like. For example, a user may wish to terminate power to a saw blade. Currently, the user must locate the power button on the tool and activate it for stopping the blade. Moreover, a user may desire a different location for the power button.

Thus, it would be desirable to provide a remote stop for a power tool, for remotely terminating the flow of electricity to an electric motor driving a working element of the tool.

SUMMARY OF THE INVENTION

Accordingly, the present invention is directed to a power tool including a wireless remote stop for terminating the flow of electricity to an electric motor. In embodiments, the electric motor is configured for operating a working element of a power tool, such as a saw blade of a table saw. For example, the wireless remote stop may be used to terminate power to a motor driving a saw blade via a belt connected to an arbor. In another instance, power is terminated to a motor driving a cutting bit. The wireless remote stop may be implemented as a hand-held device, as a foot pedal disposed of a housing, and the like.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
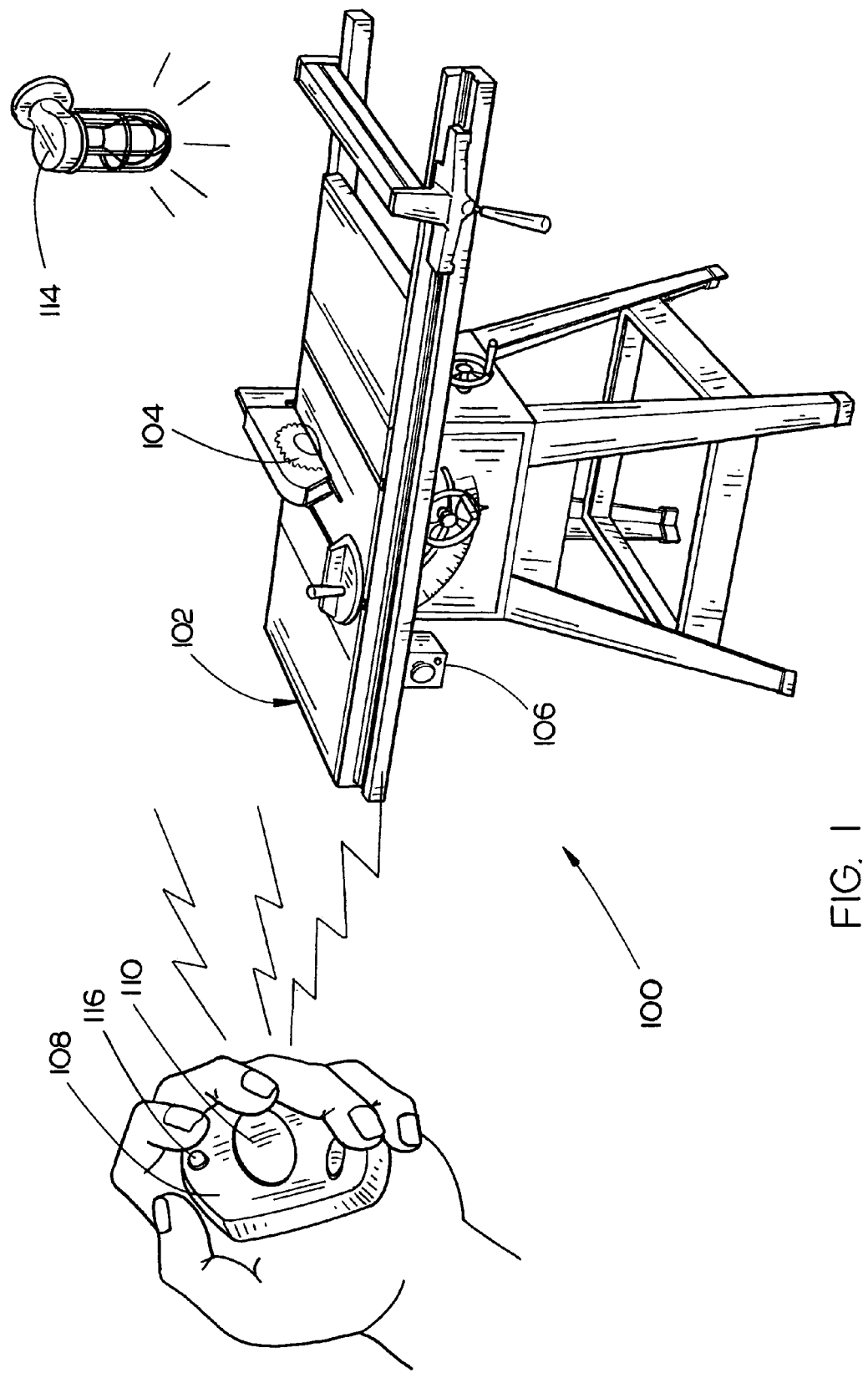
FIG. 1 is an isometric view of a table saw including a wireless remote stop in accordance with an exemplary embodiment of the present invention.
Figure 2:
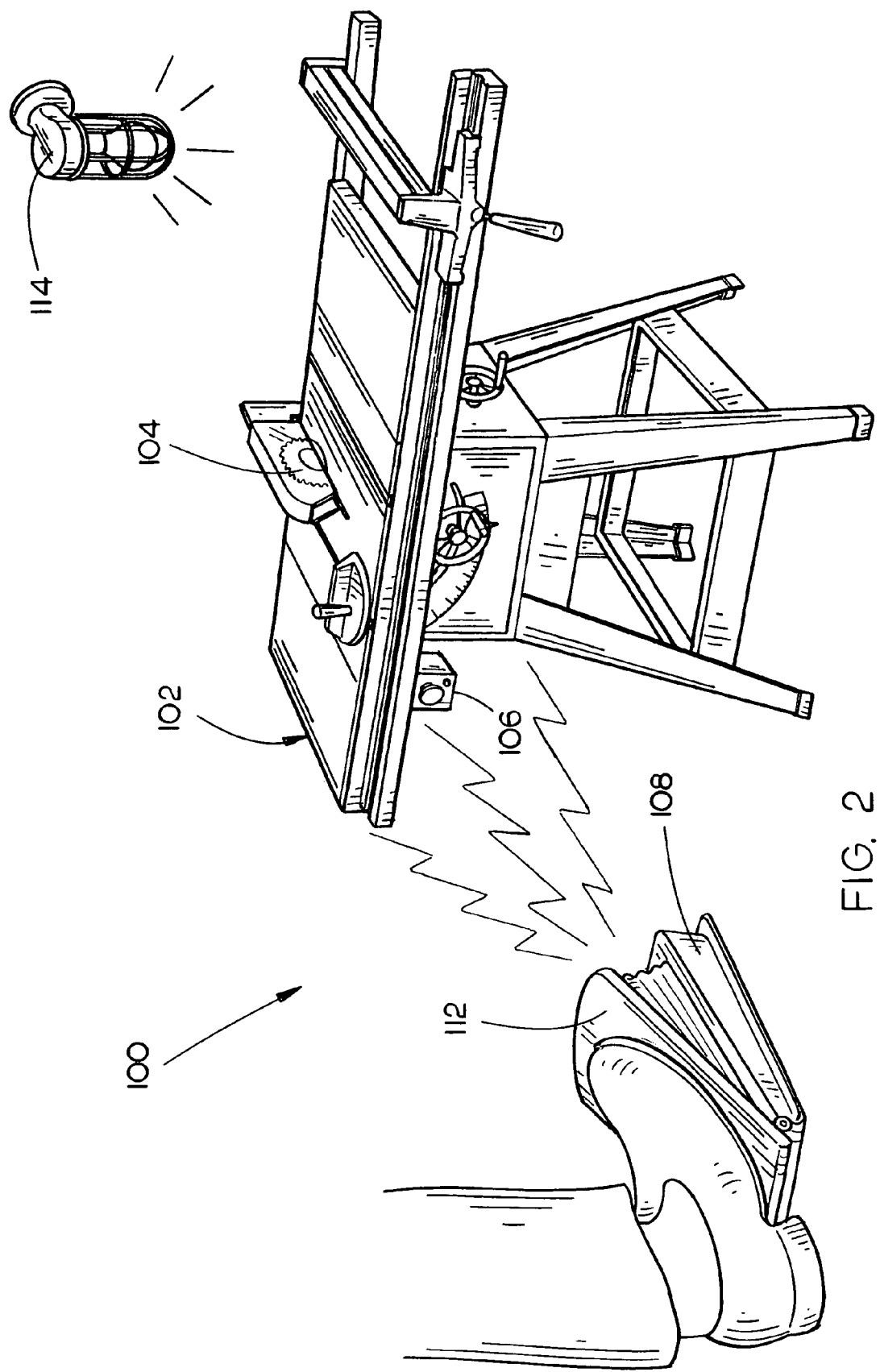
FIG. 2 is an isometric view of a table saw including a wireless remote stop in accordance with another exemplary embodiment of the present invention.

Referring to FIGS. 1 and 2, a power tool 100 including a wireless remote stop 108 for terminating the flow of electricity to an electric motor is described in accordance with an exemplary embodiment of the present invention. In embodiments, the electric motor is constructed for operating a working element of a power tool, such as a circular saw blade, a grinding element, a drilling element, a shaping element, or the like for performing a task. In an embodiment, the wireless remote stop is utilized to terminate power to a motor driving a saw blade via a belt connected to an arbor. The working tool assembly/working tool element (e.g. the arbor and circular saw blade or the cutting bit) is for performing a task on a workpiece. For example, the working tool element may shape the workpiece using cutting teeth, abrasive material, and other shaping surfaces. In a presently illustrated embodiment, the power tool 100 including the wireless remote stop 108 is utilized with a power tool such as a table saw 102 having a working tool element such as a saw blade 104. Those of skill in the art will appreciate that the wireless remote stop of the present invention may be integrated with various other power tools, including band saws, belt sanders, drill presses, grinders, lathes, and the like.

The power tool includes a receiver 106 configured to receive a wireless signal from the wireless remote stop. The receiver may include an antenna, an infrared (IR) receiver, a magnetic sensor, and the like. In an embodiment, the receiver may include an antenna configured to receive a radio frequency (RF) signal from the wireless remote stop. In another embodiment, the receiver 106 is configured to sense magnetic flux from a wireless remote stop disposed within a certain distance range of the table saw 102. In a further embodiment, the receiver is configured to receive an IR signal from the wireless remote stop. A decoder is coupled to the receiver 106 for recognizing an encoded signal wirelessly received by the receiver. In the present example, the decoder is communicatively coupled with a first switch included in the table saw 102 for interrupting power supplied to an electric motor of the table saw. The decoder communicates with the first switch for terminating the flow of electricity to the electric motor upon recognition (via the decoder) of an encoded signal wirelessly received via the receiver 106. For example, the electric motor of the table saw is operatively connected to the saw blade 104, e.g. driving a belt connected to the saw blade via an arbor. Thus, mechanical energy supplied to the saw blade is interrupted upon recognition of an encoded wireless signal, eventually causing the saw blade to stop. In further embodiments, an invasive breaking system may be integrated with table saw 102 and the wireless remote stop 108. For instance, a mechanical break, an electrical break, or another breaking mechanism initiated by the wireless remote stop may be used for stopping the saw blade 104.

A remote stop 108 is wirelessly coupled with the receiver 106. The remote stop includes an encoder for encoding a signal and a transmitter coupled to the encoder. The transmitter is configured to transmit a signal encoded by the encoder. However, the transmitter may also transmit additional wireless signals, including signals for communicating with other receivers. For example, the transmitter may transmit a signal to a third party or to an assembly incorporating an indicator such as a light. The transmitter may include an antenna, an infrared (IR) transmitter, a magnet, and the like. In an embodiment, the receiver may comprise an antenna configured to transmit an RF signal from the wireless remote stop. In another embodiment, the transmitter may be configured to generate magnetic flux to a receiver disposed within a certain distance range of the remote stop 108. In a further embodiment, the transmitter may be configured to supply an IR signal to the receiver 106. The remote stop 108 also includes a second switch for initiating wireless transmission via the transmitter of a signal encoded via the encoder. In embodiments, this signal is encoded for recognition by the decoder, which communicates with the first switch for terminating the flow of electricity to the electric motor, as previously described. In this manner, activation of the second switch causes termination of the flow of electricity to the electric motor of the table saw 102, when the encoded wireless signal is recognized by the decoder in communication with the first switch.

In an embodiment, the remote stop 108 is a hand-held fob, having a housing and a button 110. Alternatively, the remote stop may be implemented as an apparatus including a foot pedal 112, disposed in a housing and placed on a shop floor, a mat, or the like, such as conveniently placed within reach of an operator's foot. It will be appreciated that a remote stop may be implemented in a variety of housings for transmitting a wireless signal. The button 110, the foot pedal 112, or the like for selective actuation by an operator of the table saw 102, is coupled to the second switch. For instance, the button 110 may activate the second switch when pressed, while the foot pedal 112 may activate the second switch when stepped on. Alternatively, the second switch may be activated when pressure is released from the button, the foot pedal, or the like. In one instance, continual actuation of the button 110, the foot pedal 112, or a like mechanism is required for preventing activation of the second switch. In another embodiment, a device for sensing an abrupt acceleration is employed in combination with the second switch. For example, an accelerometer is implemented with a remote stop for sensing an abrupt motion for triggering the second switch; such as if the remote stop 108 is implemented as a wrist band, or the like.

It should be noted that discrete frequency ranges may be used for wireless signals transmitted by various remote stops. For instance, a first frequency range is used for a band saw while another frequency range is used for the table saw 102. In other embodiments, the signal strength may be varied for preventing unintended activation of the first switch when a remote stop is activated from a distance. For example, a supervisor utilizing a hand-held remote stop from various locations on a shop floor may require a remote stop having a greater signal range than a remote stop placed on the shop floor adjacent to a power tool, such as the table saw 102. In another instance, the power tool may include components for determining the range of the remote stop 108 from the power tool, such as for ensuring that the remote stop 108 has not been removed from the immediate area. If such determination is made, for instance, the power tool may terminate power to the motor or prevent the tool from being activated.

Preferably, a wireless signal utilized by the power tool 100 including the wireless remote stop 108 is an RF signal, but may comprise another type of wireless signal, such as an infrared signal or the like for wireless communication. Additionally, more than one type of signal may be transmitted by the remote stop. In embodiments, different signals may be used for alerting others of a condition. For instance, a wireless signal may be transmitted for triggering a notification light 112 associated with the table saw 102. The wireless signal may be the same signal used to stop the saw blade 104, or possibly of a different type. Further, the wireless signal or another signal may be used to alert a remote monitoring agency, or the like. In such instances, the remote stop may include multiple buttons, foot pedals, or the like, each additional implement for alerting one or more parties. In a still further embodiment, the remote stop may include a microphone and/or a speaker, for allowing direct communication between the user and a third party. For example, the table saw operator may speak with a third party reached through a telephone switch exchange using the power tool 100 including the wireless remote stop 108.

In embodiments, the remote stop 108, held or worn by the operator or implemented as a foot pedal, is activated by the operator for terminating the flow of electricity to the electric motor of the table saw 102. The activation may be performed by depressing the button 110, stepping on the foot pedal 112, or removing a foot from the foot pedal 112. Alternatively, the activation may be performed when pressure is released from the button, the foot pedal, or another mechanism. For instance, a pressure sensitive mat may be placed adjacent to the table saw 102, such that power is terminated if an operator steps off of the mat. The signal is encoded and transmitted as a wireless signal. The wireless signal is received and then decoded for terminating the flow of electricity to the electric motor via the first switch. The process of encoding and decoding ensures that the wireless signal is an expected signal and not a stray signal, in order to ensure that a wireless signal received for terminating power to the motor is a valid signal.

The remote stop 108 may be configured for sending a wireless signal by reloading software code into an internal processor or memory, setting a transmission pulse length, setting a level of transmission power, selecting options such as whether to send a signal to an external indicator or provide an alert to an external device, setting a range, identifying a receiver device by an address, identifying a receiver device by a serial number and revision number, and the like. A determination is made as to whether manual activation of the remote stop has occurred. A determination may also be made as to whether a condition has occurred within the remote stop to warrant the transmission of a wireless signal. For example, the remote stop 108 may transmit a signal indicating a low battery condition, or another condition requiring the attention of an operator. If not, the remote stop may enter or remain in a low power mode, such as for extending battery life. If activation has occurred, a signal may be encoded and transmitted.

The wireless sensor/receiver of the power tool 100 including the wireless remote stop 108 may be mounted on the table saw 102. In embodiments, the power to the table saw is controlled through a control device including the first switch, such as a high current relay coupled with the receiver. For example, the first switch may be integrated into a controller (such as a controller including an on and off switch, a toggle switch, or the like) for supplying power to the electric motor, terminating power to the electric motor, and/or controlling a level of power supplied to the electric motor. Such a controller may include a power button or the like for controlling the supply of power to the motor. The first switch may be integrated into the controller, coupled between the controller and the motor, or supplied with the motor. An operator may install or carry the remote stop 108 to remote locations. For example the remote stop may be worn at waist level. The remote stop may attach to the operator's belt or waistband of clothing by various mechanical attachments, such as a clasp to the operator's belt. In an additional embodiment, a remote stop is worn on the wrist of the operator by a strap or the like. The remote stop may also be worn on an operator's head. For example, the remote stop may be incorporated in various apparel or eyewear. In another alternative, the foot pedal 112 is utilized. The foot pedal may activate a switch for transmitting the wireless signal when depressed. For example, an operator may step onto or off of the foot pedal 112. A spring return mechanism, a plastic bellows, or another similar mechanism may be used to maintain the foot pedal in a normally open (i.e. non-activated) position. An external indicator 114 may be provided externally to the table saw 102 and the operator for alerting the operator to a pending condition or alerting co-workers to a condition. The indicator may be a steady light, a flashing/strobe light, a buzzer, or another similar indicator.

Preferably, the first switch is integrated in the electric system included in the table saw 102. In embodiments, the electric system of the table saw 102 is coupled with a power source, such as an alternating current (AC) power outlet. Each receptacle of the AC power outlet has two or three slots or holes to accept the prongs of a power cord included with the table saw 102. In an embodiment, the first switch is installed on or within a housing of the table saw 102, through which the electrical power supply is supplied to the tool. The housing may also contain a power supply controller. The first switch and the power supply controller may be housed separately.

Preferably, the remote stop is formed of plastic or the like, with button 110 prominently disposed in the housing of the remote stop 108. In an advantageous embodiment, the button 110 is large enough in comparison to the housing and conveniently located for access without causing undue false tripping. In the present embodiment, the remote stop 108 is powered by a battery. Additionally, an indicator, such as a light 116, may be provided to notify an operator of low battery conditions. Control elements may also be placed on the remote stop 108 to change characteristics, such as the length and intensity of the wireless signal pulse. The control elements may include enablement or disablement of certain functions, such as providing a signal to an external alert mechanism. Suitable control elements include rotary knobs, push button switches, or the like. In further embodiments, the remote stop may be implemented to vibrate, such as to gain attention when an audible warning would be ineffective.

Figure 3:
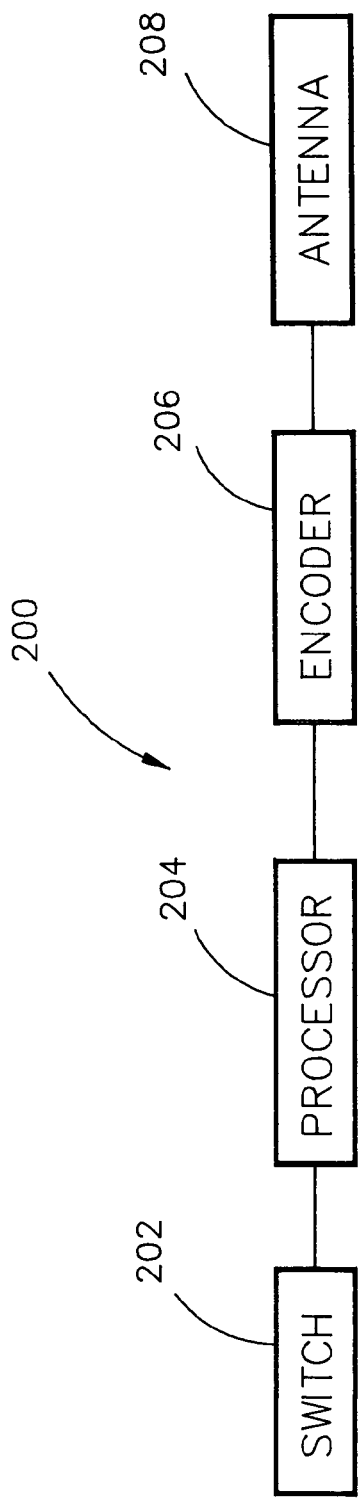
FIG. 3 is a block diagram of transmission circuitry for use with a wireless remote stop in accordance with an exemplary embodiment of the present invention.

FIG. 3 illustrates an exemplary embodiment 200 of transmission circuitry for use with a wireless remote stop in accordance with an exemplary embodiment of the present invention. When the button is pressed, switch 202 is activated, and a change of voltage level is presented to a processor 204. In embodiments, a normally closed switch or a normally open switch may be used. Instead of a manually activated switch, a switch may be used which is activated when not substantially oriented in a desired orientation; for example, a switch may be activated when the remote stop 108 is inverted, rapidly accelerated, or the like. The processor 204 may be a Programmable Interrupt Controller (PIC) or other microprocessor. Software code may be downloaded onto the microprocessor to perform the functions of the remote stop 108. The processor 204 provides a signal to the encoder 206 that then provides an encoded signal to the transmitter/antenna 208. Alternatively, an infrared light emitting diode may be used for infrared communications. Booster circuitry may be incorporated as needed or desired; for example, a booster transistor may be used to supply greater current to the transmitter/antenna 208. The power source of the remote stop is preferably a battery. The remote stop may also have a battery backup. In an additional embodiment, a low battery detector circuit may be provided. For example, a low battery detector circuit may include a voltage divider formed of two resistors providing a voltage to the base (or gate) of a transistor. Either or both resistors may be made variable to adjust the voltage applied to the base. When the base voltage drops below a threshold (such as if the power source decreases), the transistor is turned on. This causes a current to flow through the indicator, such as a light emitting diode (LED). The diode is used to isolate the battery from an electrolytic capacitor. The electrolytic capacitor helps to supply sufficient current to the indicator when the battery grows too weak.

Figure 4:
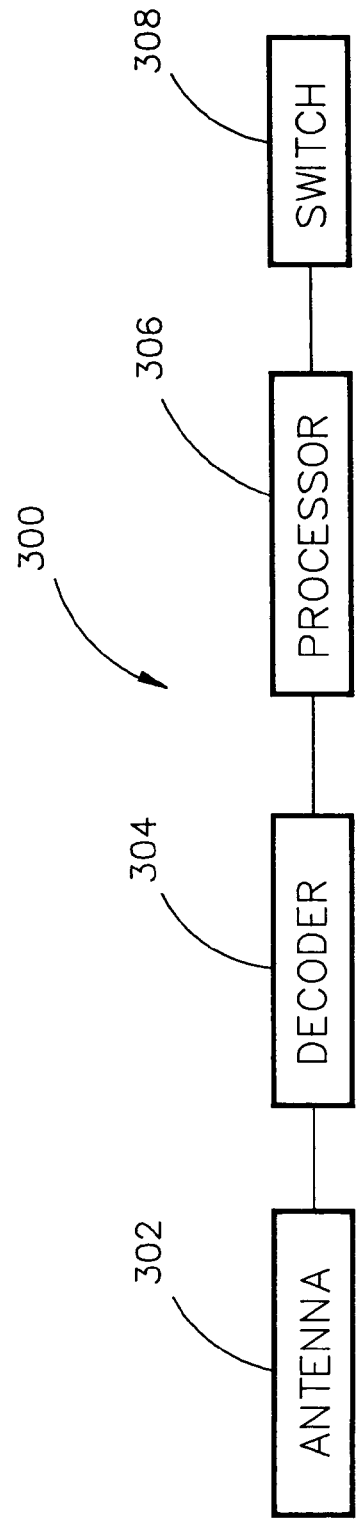
FIG. 4 is a block diagram of reception circuitry for use with a power tool including a wireless remote stop in accordance with an exemplary embodiment of the present invention.

FIG. 4 illustrates an exemplary embodiment 300 of reception circuitry for use with a power tool including a wireless remote stop in accordance with an exemplary embodiment of the present invention. An antenna 302 receives a radio frequency signal. In the current embodiment, the antenna is coupled to a receiver module that provides a signal to a decoder 304. The radio frequency signal is decoded by the decoder 304. A processor 306 included in the table saw 102 including the wireless remote stop 108 determines the command associated with the signal. A power cut-off signal may be transmitted directly to a switch 308 to cut off the power supplied to the power tool. Alternatively, the power cut-off command may be latched by a latch that then controls the actuator of the cut off switch. Another switch may determine whether a latched control signal, a momentary signal, or a signal of limited duration is applied to the switch 308. The signal selection made by switch may be set manually by a Dual In-line Package (DIP) switch or may be set through the processor 306. The switch 308 may be opened automatically or may be limited to manual release only. Various glue logic, booster circuits, protective circuits, and the like are contemplated by the present invention.

Those of skill in the art will appreciate that while preferred embodiments of the power tool 100 including the wireless remote stop 108 have been described as including an encoder for encoding a signal and a decoder for decoding a signal, the use of such an encoder and decoder is not necessary for the functioning of the present invention. For example, an RF signal may be transmitted on a pre-selected discrete wavelength or range of wavelengths for receipt by the receiver 106. Upon receipt of a signal transmitted on the pre-selected wavelength, the first switch may be activated for terminating power to the working tool element of the power tool. For instance, the receiver 106 is communicatively coupled with the first switch included in the table saw 102 for interrupting power supplied to the electric motor of the table saw. The receiver communicates with the first switch for terminating the flow of electricity to the electric motor upon receipt of a wireless signal transmitted on the pre-selected wavelength. Similarly, the transmitter may be coupled with the second switch, for transmitting a signal on the pre-selected wavelength when the second switch is activated. It will be appreciated that other signals may be used as well, including RF signals, magnetic signals, and the like for being received by the receiver 106.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A power tool, comprising:
   a working tool assembly configured to receive a working tool for performing a task on a workpiece;
   an electric motor operatively connected to the working tool assembly;
   a receiver configured to receive a wireless signal;
   a decoder coupled to the receiver, the decoder for recognizing an encoded signal;
   a first switch included in the power tool for interrupting power supplied to the electric motor; and
   a remote stop wirelessly coupled with the receiver, the remote stop including
      an encoder for encoding a signal and
      a transmitter coupled to the encoder, the transmitter configured to transmit a wireless signal, and
      a second switch for initiating wireless transmission via the transmitter of a signal encoded via the encoder,
   wherein the first switch is communicatively coupled with the decoder for terminating the flow of electricity to the electric motor upon recognition via the decoder of an encoded signal wirelessly received via the receiver.

2. The power tool of claim 1, further comprising a fob housing for substantially encompassing the remote stop.

3. The power tool of claim 2, wherein the fob is configured to be worn by a user.

4. The power tool of claim 1, further comprising a foot pedal coupled to the second switch such that manipulation of the foot pedal activates the second switch.

5. The power tool of claim 4, wherein constant actuation of the foot pedal is required to maintaining a flow of electricity to the motor.

6. The power tool of claim 1, wherein the second switch is connected to an accelerometer such that pre-selected acceleration of the remote stop activates the second switch.

7. The power tool of claim 1, wherein the encoder encodes a second signal to be transmitted to at least one of an external indicator or a remote monitor.

8. The power tool of claim 1, wherein the transmitter transmits at least one of a radio frequency signal, an infrared signal, or a microwave signal.

9. The power tool of claim 1, further comprising a visual indicator communicatively coupled with the remote stop.

10. The power tool of claim 1, wherein the first switch is integrated in an electric system included in the power tool, the electric system for supplying power to the electric motor.

11. A table saw, comprising:
    an arbor configured to receive a circular saw blade for cutting a workpiece;
    a receiver configured to receive a wireless signal;
    a decoder coupled to the receiver, the decoder for recognizing an encoded signal;
    an electric system including:
       an electric motor operatively connected to the arbor; and
       a first switch coupled to the electric motor for interrupting power supplied to the electric motor; and
    a remote stop wirelessly coupled with the receiver, the remote stop including:
       an encoder for encoding a signal; and
       a transmitter coupled to the encoder, the transmitter configured to transmit a wireless signal, and
       a second switch for initiating wireless transmission via the transmitter of a signal encoded via the encoder,
    wherein the first switch is communicatively coupled with the decoder for terminating the flow of electricity to the electric motor upon recognition via the decoder of an encoded signal wirelessly received via the receiver.

12. The table saw of claim 11, further comprising a fob housing for substantially encompassing the remote stop.

13. The table saw of claim 12, wherein the fob is configured to be worn by a user.

14. The table saw of claim 11, further comprising a foot pedal coupled to the second switch such that manipulation of the foot pedal activates the second switch.

15. The table saw of claim 14, wherein constant actuation of the foot pedal is required to maintaining a flow of electricity to the motor.

16. The table saw of claim 11, wherein the second switch is connected to an accelerometer such that pre-selected acceleration of the remote stop activates the second switch.

17. The table saw of claim 11, wherein the encoder encodes a second signal to be transmitted to at least one of an external indicator or a remote monitor.

18. The table saw of claim 11, wherein the transmitter transmits at least one of a radio frequency signal, an infrared signal, or a microwave signal.

19. The table saw of claim 11, further comprising a visual indicator communicatively coupled with the remote stop.

20. The table saw of claim 11, wherein the first switch is integrated in an electric system included in the table saw, the electric system for supplying power to the electric motor.

21. A power tool, comprising:
    a working tool assembly configured to receive a working tool for performing a task on a workpiece;
    an electric motor operatively connected to the working tool assembly;
    a receiver configured to receive a wireless signal;
    a first switch included in the power tool for interrupting power supplied to the electric motor; and
    a remote stop wirelessly coupled with the receiver, the remote stop including
       a transmitter configured to transmit a wireless signal, and
       a second switch for initiating wireless transmission via the transmitter of a signal,
    wherein the first switch is communicatively coupled with the receiver for terminating the flow of electricity to the electric motor upon receipt of a signal wirelessly received via the receiver.

* * * * *